C. W. McCLENAHAN.
Cotton-Planter.
No. 30,743. Patented Nov. 27. 1860.
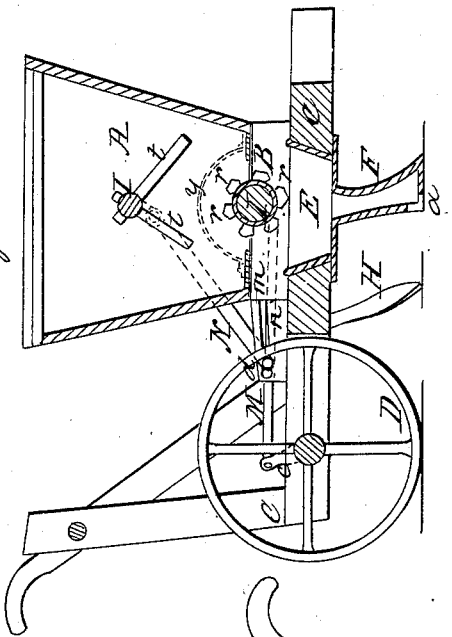
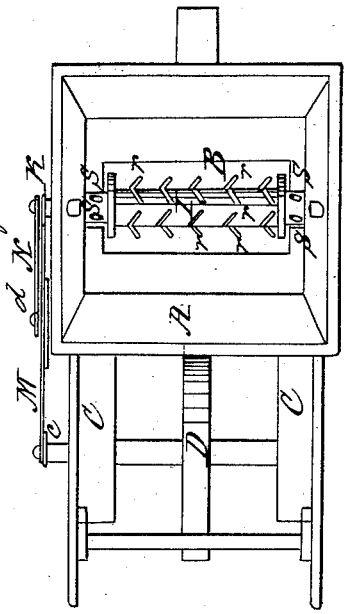
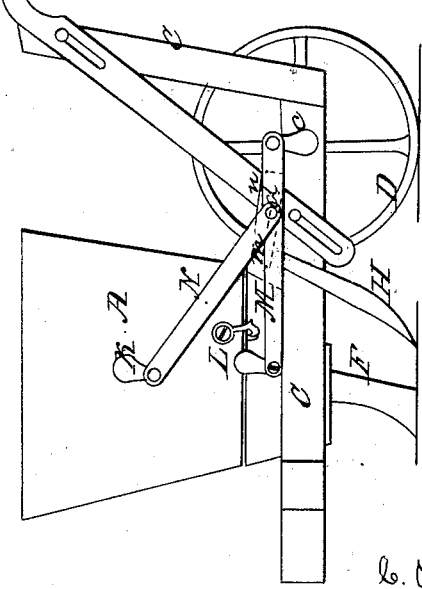
Witnesses:
Inventor:

UNITED STATES PATENT OFFICE.

C. W. McCLANAHAN, OF VICTORIA, TEXAS.

IMPROVEMENT IN COTTON-SEED PLANTERS.

Specification forming part of Letters Patent No. 30,743, dated November 27, 1860.

*To all whom it may concern:*

Be it known that I, C. W. McCLANAHAN, of the city and county of Victoria, and State of Texas, have invented a new and useful Improvement in Cotton-Seed Planters; and I do hereby declare that the following is a full, clear, and exact description of the same, reference being had to the accompanying drawings, forming a part of this specification, in which—

Figure 1 is a side elevation of my machine. Fig. 2 is a vertical longitudinal section of the same; and Fig. 3 is a plan view, the stirrer being removed.

Similar letters of reference in each of the several figures indicate corresponding parts.

To enable others skilled in the art to make and use my invention, I will proceed to describe its construction and operation.

A represents the hopper, with a large discharge-passage, B, in its bottom. The hopper rests on a frame, C, which has adjustable handles, and is supported by a central revolving wheel, D, and constructed with an opening, E, at the center for the seed to pass through. Under the opening E a hollow drill forming and guiding tooth, F, is arranged, said tooth discharging at its heel through passage *a*. Behind the drill-tooth coverers H are arranged.

I is a distributing-cylinder, and J a stirring-cylinder. On the circumference of the cylinder I a number of small blades, *r*, are placed diagonally, one line of blades standing across the cylinder in one direction and other line in an opposite direction, and so on all round the cylinder and from end to end of the same.

The stirrer consists of two rows of bars, *t t*, projecting radially from the under side of the cylinder J, as represented.

In order to give a reciprocating motion to the stirrer and a continuous rotary motion to the distributer, I have combined with the same and with the ordinary crank-arm, *c*, of the propelling and supporting wheel D the following novel arrangement.

K is a crank-arm on the end of the stirrer-cylinder; L, a crank-arm on the end of the distributer-cylinder. M is a pitman connecting the distributer crank-arm K with the crank-arm *c* of the propelling-wheel shaft. N is a pitman connecting the pitman M with the crank-arm K of the stirrer-cylinder. The pin *d*, which forms this connection, passes through and works freely back and forth in an inclined slot, *m*, of a stationary guide-plate, *n*. By thus connecting the distributing-cylinder and stirring-cylinder the one crank-arm of the propelling-wheel shaft is made to answer for giving a reciprocating motion to the stirrer and a rotary motion to the distributer, for it will be seen that the inclined slot allows the pin *d* to change its position, so that the crank-arm of the distributer may complete its revolution, and at the same time holds the pin down, so that the clamp-arm of the stirrer shall only be able to make a half-revolution.

My machine is particularly designed for planting cotton-seed, and when used for this purpose the seed is placed in the hopper and the machine propelled forward on the wheel D. As the wheel revolves the stirrer is reciprocated and the distributer revolved, and the former caused to agitate the seed, while the blades of the latter carry the agitated separated seed out through the passage B and into the drill-tooth, from whence it falls into the drill formed by said tooth. As fast as the seed is planted it is covered by the coverers H and rolled in by the wheel D.

If it is desired to plant corn with this machine, all that has to be done is to place an arch-formed cover, *y*, over the main distributer, as shown in red, and to form holes *s s* in the circumference of the distributer-shaft, near each end, as shown.

What I claim as my invention, and desire to secure by Letters Patent, is—

The combination and arrangement of the reciprocating stirrer J *t t*, rotary distributer I *r*, crank-arms *c* K L, pitmen M N, pin *d*, slotted guide-plate *m n*, hopper A, drill-tooth F, and coverers H, substantially in the manner and for the purpose herein described.

The above specification of my improved seed-planters signed by me this 11th day of September, 1860.

C. W. McCLANAHAN.

Witnesses:
   GOODWIN Y. AT LEE,
   R. W. FENWICK.